United States Patent [19]

Otsuka et al.

[11] Patent Number: 4,579,223
[45] Date of Patent: Apr. 1, 1986

[54] OXYGEN ABSORBENT PACKET

[75] Inventors: Sadao Otsuka, Nagareyame; Takehiko Moriya, Tokyo; Toshio Komatsu, Tokyo; Akira Katada, Tokyo, all of Japan

[73] Assignee: Mitsubishi Gas Chemical Company Inc., Japan

[21] Appl. No.: 574,627

[22] Filed: Jan. 27, 1984

[30] Foreign Application Priority Data

Jan. 28, 1983 [JP] Japan .................. 58-12411
Feb. 16, 1983 [JP] Japan .................. 58-24306
Feb. 18, 1983 [JP] Japan .................. 58-26056
Feb. 18, 1983 [JP] Japan .................. 58-26057

[51] Int. Cl.⁴ .................................. B65D 81/26
[52] U.S. Cl. .................................. 206/204; 206/484; 206/484.2; 206/524.2; 426/124; 428/68
[58] Field of Search ............... 55/158, 387; 206/204, 206/205, 484, 484.1, 484.2, 524.1, 524.2; 423/219; 426/124; 428/68, 69, 72, 76, 178, 35

[56] References Cited

U.S. PATENT DOCUMENTS 4,287,995  9/1981  Moriya .
4,332,845  6/1982  Nawata et al.
4,421,235  12/1983  Moriya .
4,485,133  11/1984  Ohtsuka et al. .................. 428/35

FOREIGN PATENT DOCUMENTS 698776   11/1964  Canada ............... 426/124
53-51096  5/1978  Japan .
54-103193 8/1979  Japan .
109428    8/1980  Japan .................. 55/387
56-124440 9/1981  Japan .
56-124441 9/1981  Japan .
183964   11/1982  Japan .................. 206/484
183965   11/1982  Japan .................. 206/484

Primary Examiner—George E. Lowrance
Assistant Examiner—Jimmy G. Foster
Attorney, Agent, or Firm—Leydig, Voit & Mayer, Ltd.

[57] ABSTRACT

An oxygen absorbent packet comprising an oxygen absorbent packaged and sealed in a double packaging material 6 comprised of a gas-permeable outer material layer 1 composed of a plastic film or transparent paper, a gas-permeable sealing layer 2, an inner material layer 3 composed of gas-permeable paper or nonwoven cloth, and a gas-permeable sealing layer 4, and also containing an air layer 5 between layers and 1 and 2 or between layers 2 and 3.

25 Claims, 4 Drawing Figures

OXYGEN ABSORBENT PACKET

BACKGROUND OF INVENTION

The present invention relates to an oxygen absorbent packet employing a double packaging material.

The use of oxygen absorbents for the preservation of food products and other items has recently grown increasingly common. Oxygen absorbents typically consist primarily of a metal powder, such as iron, organic compounds such as hydroquinone, catechol, and ascorbic acid, or reducing sulfur compounds such as sulfites and dithionites. They are normally used in packet form with the absorbent enclosed in an air-permeable packaging material. The oxygen-absorbing properties of an oxygen absorbent vary with the properties of the main component, such as iron, but the properties of the packaging material in which the absorbent is enclosed also have a substantial effect on the performance of the oxygen absorbent. In particular, the oxygen absorption rate is primarily a function of the gas permeability of the packaging material. Moreover, when an oxygen absorbent is used with high-moisture food products, the transfer of moisture between the food and the oxygen absorbent has a very significant effect on the performance of the absorbent. The degree and manner in which this transfer of moisture takes place is to a large extent determined by the construction of the packaging material.

A laminate of paper and perforated polyethylene film has hitherto been used as the packaging material for oxygen absorbents. However, when an oxygen absorbent packet made with this type of packaging material is used to help preserve a food product with a high moisture content, the packaging material becomes damp because of the paper's lack of resistance to water, resulting in the staining of the oxygen absorbent packet.

Another drawback of this type of packaging material is that deformation of the holes present to provide gas-permeability may occur during heat-sealing, resulting in at least a partial loss of air-permeability and/or leakage or oozing out of the packet contents, marring the appearance of the packet. Under such circumstances, it has been impossible to raise the oxygen absorption rate by increasing the number or size of the holes. Yet another significant problem is the threat to safety and hygiene posed by the leakage of the packet contents (oxygen absorbent) through the packaging material.

Japanese Patent Publication (Kokai) No. 51096/78 discloses a method for perforating two plastic films having different melting points, then placing one film over the other (or sandwiching a sheet of paper between the two) and bonding the layers together to form a laminated packaging material for an oxygen absorbent. However, in this method the heat-sealing process can cause the holes to become deformed or even closed. Accordingly, the controlled production of packaging material having the uniform, desired level of air-permeability is very difficult.

Another problem is that the gas-permeability varies depending on how well each of the films and the paper are bonded to each other in the bonding process. Japanese Patent Publications (Kokai) Nos. 124440/1981 and 124441/1981 disclose similar inventions in which the same problem arises. Here too, the gas-permeability varies a great deal depending on the bonding conditions during lamination. Other areas of concern include the influence of the adhesive used on the air-permeability and the safety and health problems associated with adhesive use.

The inventors conducted careful studies in an attempt to develop an oxygen absorbent packet that uses a packaging material the external appearance of which is not marred even when employed to preserve foods with a high moisture content, and which material, in addition, is hygienically safe and provides good control of gas-(or air-)permeability at the desired level in a uniform, reproducible manner. As a result of these efforts, the inventors ultimately arrived at the present invention.

SUMMARY OF INVENTION

The present invention substantially overcomes the problems described above with regard to the prior art.

One object of the present invention is to provide an oxygen absorbent packet that does not require complicated processing steps, minimizes product loss, and in which the number and size of the holes present to provide air permeability can be adjusted at will during production.

Another object of the present invention is to provide an oxygen absorbent packet in which only the edges of the double packaging material are sealed, thus avoiding deformation of the holes therein by heat or the like.

Yet a further object of the present invention is to provide an oxygen absorbent packet that has several other advantages. These advantages are a result of the construction of the oxygen absorbent packet of the invention which employs a double packaging material with a layer of air sandwiched between an outer material layer and an inner material layer. On the back side (or inner side) of the outer material layer, concealed, full-surface printing and letter printing can be carried out. Additionally, the resulting packet has a high resistance to water. Further, there is no oozing or leakage of the packet contents onto the outer material surface or consequent deterioration in appearance and hygienic safety because there is no direct contact between the food product and the ink. Additionally, the manufacture of the packet is straightforward, providing ease of production.

The present invention is directed to an oxygen absorbent packet comprising oxygen absorbent packaged and sealed in a double packaging material (6) comprising a gas-permeable outer material layer (1) comprised of a plastic film or transparent paper, a gas-permeable sealing layer (2), a gas-permeable inner material layer (3) comprised of paper or nonwoven fabric, a gas-permeable sealing layer (4), and an air layer (5) between layers (1) and (2) or layers (2) and (3).

BRIEF EXPLANATION OF THE DRAWINGS

The drawings show the oxygen absorbent packet and the construction of the double packaging material (6) employed in different embodiments of the present invention.

DETAILED DESCRIPTION OF THE INVENTION

Figure 1:
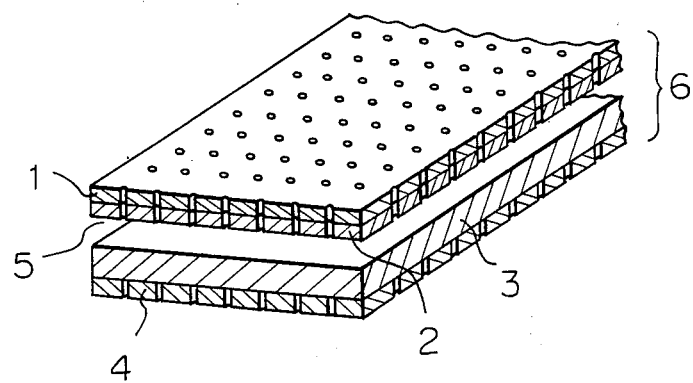
FIG. 1 shows a double packaging material (6) useful in preparing one embodiment of the invention in which the air layer (5) lies between sealing layer (2) and inner material layer (3).

In the present invention and referring to the drawings, the permeable outer material layer (1) can be a plastic film or a paper, preferably transparent to allow printing on its back side (or inner side). The plastic film or paper should be strong enough to withstand packet production and use. Useful plastic films include polyethylene terephthalate, a polyamide, polypropylene, a polycarbonate or cellophane. The plastic film may have a thickness of from 5 to 30 micrometers, preferably from 10 to 20 micrometers. Alternatively, transparent paper such as glassine paper, parchment paper, or the like may be used. The most desirable of these, from the standpoint of strength and ease of handling during production, is polyethylene terephthalate (PET) film. The main purpose of the outer material layer (1) in the present invention is to provide control of the air-permeability and to impart water-resistance to the packet.

In the present invention, sealing layer (2) is used to seal the outer material layer (1) and inner material layer (3) when the oxygen absorbent is packaged and sealed. A film of polyethylene (PE), ethylene-vinylacetate copolymer (EVA), ionomer resin, polybutadiene, polyvinyl chloride (PVC) or the like having a thickness in the range of 10 to 50 micrometers, and preferably 15 to 30 micrometers may be used as sealing layer (2). Alternatively, a heat-sealing adhesive may be used as the sealing layer (2). Examples of heat-sealing adhesives that may be used include ordinary hot melt adhesives such as hot melt emulsions, ionomer latexes, ionomer emulsions, polyethylene emulsions, or ethylene-vinylacetate copolymer emulsions. The amount of the heat-sealing adhesive applied generally ranges from 0.5 to 30 grams per square meter ($g/m^2$), and preferably from 5 to 20 $g/m^2$.

When the heat-sealing adhesive is applied in a reticular manner it may be applied heavily since porosity is maintained in the uncoated regions. The position of the sealing layer (2) is determined according to where the air layer (5) is positioned. For example, when air layer (5) is positioned between sealing layer (2) and inner material layer (3), the sealing layer (2) is bonded such as to form a laminate therewith. Conversely, when air layer (5) is positioned between outer material layer (1) and sealing layer (2), the sealing layer is bonded to inner material layer (3), forming a laminate therewith. Sealing layer (2) is not limited to just one layer. In some cases, depending on the fusibility between (a) the sealing layer (2) and (b) the outer material layer (1) and the inner material layer (3) during packet production, two sealing layers (2) may be used between the outer material layer (1) and the inner material layer (3).

To impart gas-permeability to outer material layer (1) and sealing layer (2), when an air layer is provided between the sealing layer (2) and the inner material layer (3), the outer material layer (1) and the sealing layer (2) are bonded or fused tightly together, and then perforated, e.g., with needles. The ends of the needles used may be shaped in the form of a cone, a quadrangular pyramid, a triangular pyramid, or a cone sharpened at the tip. The size of the holes is adjusted by the needle size and the force applied during perforation. Holes of uniform shape may be formed by heating the needles. The number of holes should be set in accordance with such factors as the amount, application, and performance of the oxygen absorbent and the size of the holes. For example, in the case of oxygen absorbent packets measuring 5cm×5cm, at least one hole is required, but the total number of holes should not exceed 500 and preferably should not exceed 200. Too large a number of holes is undesirable since the resistance to water decreases and printing becomes difficult to read as the appearance of the printed surface deteriorates.

When air layer (5) is provided between outer material layer (1) and sealing layer (2), and sealing layer (2) is bonded to the inner material layer (3) to form a laminate, a method similar to that used in perforating the outer material layer (1) and the sealing layer (2) as described above may be used whereby the sealing layer (2) is perforated to make it air-permeable, and it is then bonded to inner material layer (3). Alternatively, sealing layer (2) may be perforated to make it air-permeable after it has been bonded to inner material layer (3). An alternative method is to apply a sealing layer thin enough that it does not hamper the gas permeability of inner material layer (3). In the alternative, if the heat-sealing adhesive is applied in a reticular pattern to form sealing layer (2), the coating applied need not be as thin since air or gas will be able to permeate inner material layer (3) through the portion of inner material layer (3) not coated with the adhesive.

In the present invention, the main function of internal material layer (3) is to hold the packet contents and to prevent the leakage of powdered material. Paper or nonwoven fabric may be used as inner material layer (3). Japanese paper, a mixture of Japanese paper with rayon, or paper into which polyethylene or a plastic with a lower softening point than polyethylene has been incorporated during papermaking may be used as the paper referred to above. A paper with a basis weight in the range of 20 to 100 $g/m^2$ is desirable.

Spunbonded nonwoven fabric, or the like, may be employed as the nonwoven fabric used as inner material layer (3). The material of which this fabric is made may be a polyamide, polyethylene terephthalate, rayon or the like.

When it is necessary that the inner material layer (3) be water and/or oil repellent, the paper or nonwoven fabric used as inner material layer (3) may be treated with a water repellent and/or oil repellent. An inner material layer (3) reinforced with split fiber may be used where necessary.

In this invention, gas-permeable sealing layer (4) may be a sealing layer similar to sealing layer (2), i.e., comprised of a perforated film made of polyethylene, ethylene-vinylacetate copolymer, ionomer, polybutadiene, or polyvinyl chloride; a gas-permeable polyethylene or other gas-permeable film with cracks in it; or a perforated, plastic film reinforced with split fibers. In each instance, sealing layer (4) is bonded to the inside surface of inner material layer (3), i.e., that surface facing away from outer material layer (1), and toward the oxygen absorbent (8) in the formed oxygen absorbent package. Alternatively, sealing layer (4) may be a thin, plastic layer provided with gas-permeability, e.g., by perforation with a needle as described above, that has been formed by the application of a thin coating of the same type of sealing adhesive as that used in sealing layer (2) onto the inside surface of inner material layer (3). The number of holes in sealing layer (4) should preferably be as large as is possible without interfering with the sealing properties thereof. In general, the porosity, i.e., the amount of surface area that is open, is from 0.2 to 30%, and preferably from 1 to 20%.

Figure 2:
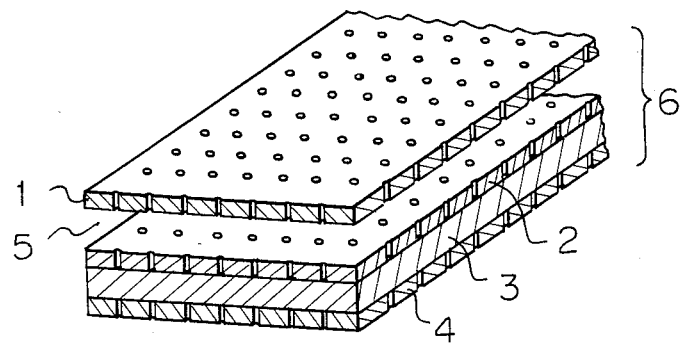
FIG. 2 shows a double packaging material (6), used in an alternative embodiment of the invention, in which the air layer (5) lies between outer material layer (1) and sealing layer (2).
Figure 3:
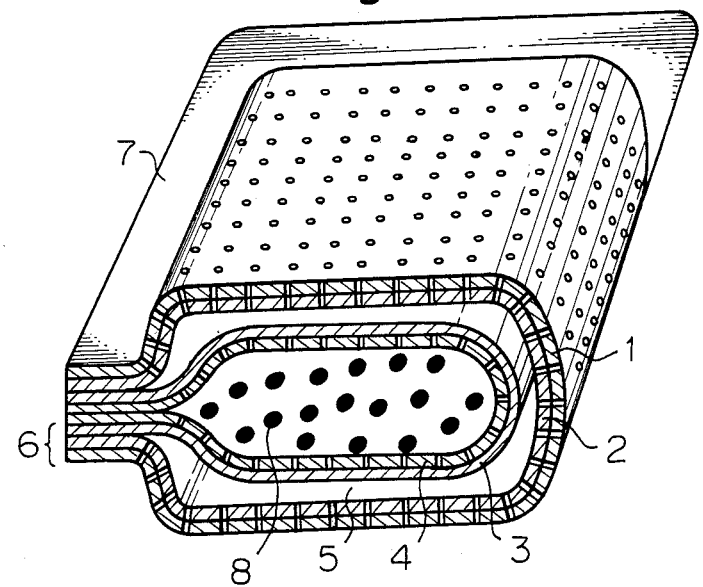
FIG. 3 is an oblique, sectional view of an oxygen absorbent packet of the invention formed by folding the double packaging material (6) over on itself or in half, placing oxygen absorbent (8) inside the folded material, and sealing the material on three sides.
Figure 4:
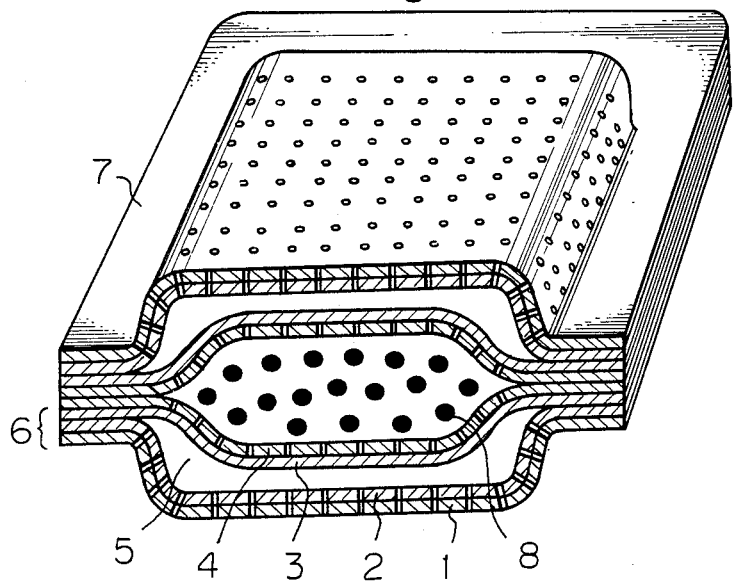
FIG. 4 is an oblique, sectional view of an oxygen absorbent packet formed by placing oxygen absorbent (8) between two sheets of the double packaging material (6), with a gas-permeable sealing layer (4) of each sheet on the inside, and sealing the material on all four sides.

A distinctive feature of the present invention is that the oxygen absorbent (8) is placed within a double packaging material (6) in which an air layer (5) has been provided between an outer material and an inner material, or to state it more precisely, between an outer material layer (1) and an inner material layer (3), such that the outer material layer (1) is on the outside and the inner material layer (3) is on the inside, and the packaging material is sealed around its periphery with the oxygen absorbent sealed within the inner material layer (3) to form a packet of any desired shape. The air layer between outer material layer (1) and inner material layer (3) may be provided in either of two ways: the air layer (5) may be positioned between the inner material layer (3) and the sealing layer (2) side of a laminate formed by bonding or heat-sealing together outer material layer (1) and sealing layer (2) (see FIG. 1), or alternatively, the air layer (5) may be positioned between outer material layer (1) and the sealing layer (2) side of a laminate formed by bonding or heat-sealing together inner material layer (3) and sealing layer (2) (see FIG. 2).

Two alternative preferred methods may be employed to manufacture the oxygen absorbent packet of the present invention. The first, referred to hereinafter as the three-side sealing method, comprises the steps of folding the double packaging material (6) over on itself (or in half) with sealing layer (4) on the inside, inserting the oxygen absorbent therein, and forming this into a rectangular oxygen absorbent packet by heating the edges of the packaging material around the oxygen absorbent in any desired manner, such as on three sides. The second type, referred to hereinafter as the four-side sealing method, comprises the steps of placing oxygen absorbent between two sheets of the double packaging material (6) with sealing layers (4) on the inside and then sealing the entire border about the oxygen absorbent in any desired manner, a preferred manner being heating the border on four sides to form a seal.

In the three-side sealing method, as described above, it is desirable to have the outer material layer (1) be slightly larger than the inner material layer (3), and to bond the outer material layers (1) on three sides of the packet to each other with the inner material layers enclosed therebetween. This increases the water resistance of the packet and reduces the tendency of the inner and outer material layers to peel or separate.

The outer material of the present invention comprises either an unlaminated sheet of paper or plastic film (1), or as part of a laminate consisting of outer material layer (1) and sealing layer (2). However, based on the relative sealing strengths, it is preferable to use a laminate consisting of a sealing layer bonded to a plastic film. Specific examples include PET/PE and PET/EVA laminates.

The inner material is comprised of a laminate. The inner material layer (3) may be used either as part of a laminate in which one side is bonded to sealing layer (4) and the other side facing outer material layer (1) is bonded to sealing layer (2), or as a laminate that does not include sealing layer (2). Of these, use of the following types of laminate construction, to give several examples, are desirable from the standpoint of sealing strength and gas-permeability: paper/PE, nonwoven fabric/PE, sealing adhesive/paper/PE, sealing adhesive/nonwoven fabric/PE, paper/sealing adhesive, and paper/cracked film.

The double packaging material (6) in this invention contains an air layer (5). When sealing layer (2) is bonded to inner material layer (3), this air layer (5) is provided between outer material layer (1) and sealing layer (2). When sealing layer (2) is bonded to outer material layer (1), air layer (5) is provided between sealing layer (2) and inner material layer (3).

Of the above-described types of double packaging materials (6), the following types of combinations, by way of illustration, are preferred because of the sealing strength of the resulting packets, the strength of the packaging material, and because of other factors, such as ease of production, economics and the like.

| Outer Material | Inner Material |
| --- | --- |
| 1. PET/PE | paper/EVA |
| 2. Stretched polyamide/EVA | rayon mixed paper/linear low-density polyethylene (LLDPE) |
| 3. Parchment paper/PE | PE mixed paper/hot-melt coating |
| 4. PET/ionomer | EVA sealing adhesive/oil-resistant paper/PE |
| 5. PET | EVA sealing adhesive/paper/EVA sealing adhesive |
| 6. glassine paper | PE/water- and oil-resistant paper/PE |

The most preferred combination of the six set out above are 1, 2 and 4. The combination of an outer material such as PET/PE with such inner materials as rayon mixed paper/PE is also particularly desirable. PET is particularly desirable as the outer material layer (1), in part because of the standpoint of strength and ease of handling during production and of the good quality of letter printing and white, full surface printing which can be applied to it.

In the present invention, a broad variety of oxygen absorbents may be used. Exemplary absorbents include sulfites, hydrogen sulfites, thiosulfates, dithionites, hydroquinone, catechol, resorcinol, pyrogallol, gallic acid, sodium formaldehyde sulfoxylate, ascorbic and isoascorbic acid and their salts, sorbose, glucose, lignin, dibutylhydroxytoluene, butylhydroxyanisole, ferrous salts and metal powders such as iron powder. Carbon dioxideevolving oxygen absorbents or carbon dioxide-absorbing oxygen absorbents may also be used.

In the present invention, the sealing method used when enclosing and sealing the oxygen absorbent in the double packaging material may comprise adhesion-bonding, contact-bonding, such as press bonding, fusion-bonding, such as heat sealing, as well as other methods. Of these, in terms of the sealing strength and workability, heat-sealing is the most desirable.

In the present invention, the oxygen absorbent packet is generally produced by means of a three-side sealing method or a four-side sealing method. One example of a three-side sealing method that may be used consists of folding the double packaging material (6) in half, or, stated alternatively, over on itself, with sealing layer (4) on the inside, placing within this folded packaging material an appropriate amount of oxygen absorbent (either before or after the folding operation), and heat-sealing on three sides with the oxygen absorbent inside to form the sealed oxygen absorbent package. A three-side sealing automatic filling and packaging machine or other means may be used to do this.

Alternatively, an oxygen absorbent packet sealed on four sides may be provided by placing two sheets of the double packaging material (6) face to face with the sealing layers (4) on the inside, placing a suitable amount of oxygen absorbent between the two sheets or, alternatively, on one of the sheets before the other sheet is superimposed on it, and then heat-sealing the edges of the packet, sealing it on all four sides. One possible way to accomplish this is to use a four-side sealing automatic filling and packaging machine.

Further advantages and objects of the invention will become apparent from the following examples, which are given here for illustrative purposes only and are not intended to limit in any way the scope of the invention.

EXAMPLE 1

Outer material: 12 micrometer thick polyethylene terephthalate film.

Inner material: Five $g/m^2$ of ethylene vinylacetate copolymer heat-sealing adhesive was applied to one side of a sheet of pure white paper (40 $g/m^2$), and the other side of the paper was laminated to a polyethylene film having a porosity of 15%. A predetermined number of holes (as indicated in Table 1 below) were made in the outer material using 0.5-mm needles, following which oxygen absorbent packets, each measuring 50 mm × 50 mm and containing 3 grams of iron-based oxygen absorbent, were prepared using a three-side sealing automatic filling and packaging machine. The oxygen absorbent packets obtained were individually sealed in air impermeable bags together with 500 ml of air, and the length of time required for the oxygen concentration within the bag to be reduced to 0.1% (by volume) measured at 25° C. The results are given in Table 1.

TABLE 1

| Number of holes per packet (in the outer material) | Time required for oxygen concentration to be reduced to 0.1% (hours) |
|---|---|
| 50 | 18 |
| 25 | 25 |
| 10 | 35 |

EXAMPLE 2

Outer material: A laminated film consisting of a 12 micrometer thick polyethyiene terephthalate film to the back (inner side) of which had been applied letter printing and white fullsurface printing, and which had then been laminated to a 30 micrometer thick polyethylene film.

Inner material: A sheet consisting of Japanese paper (50 $g/m^2$) to one side of which had been laminated a linear low-density polyethylene (LLDPE) film having uniformly distributed holes 1 mm in size and a porosity of 20%.

Oxygen absorbent packets were prepared in the same manner as in Example 1 and the same test was performed on each sample. The results obtained are given in Table 2.

TABLE 2

| Number of holes per packet (in the outer material) | Time required for oxygen concentration to be reduced to 0.1% (hours) |
|---|---|
| 50 | 17 |
| 25 | 25 |
| 10 | 37 |

EXAMPLE 3

Outer material: A sheet formed by laminating (a) a stretched, 15 micrometer thick nylon film to the back of which had been applied letter printing and white full-surface printing, with (b) a 30 micrometer thick ethylene vinylacetate copolymer film.

Inner material: A sheet of Japanese paper (50 $g/m^2$) on one side of which a polyethylene film (20 micrometers in thickness) was secured by heat sealing and cracks formed in the film.

Oxygen absorbent packets were prepared in the same manner as in Example 1 and the same test was performed on each sample. The results obtained are given in Table 3.

TABLE 3

| Number of holes per packet (in the outer material) | Time required for oxygen concentration to be reduced to 0.1% (hours) |
|---|---|
| 50 | 20 |
| 25 | 27 |
| 10 | 40 |

EXAMPLE 4

Outer material: A sheet formed by laminating a 12 micrometer thick polyethylene terephthalate film to the back of which was applied letter printing and white, full-surface printing, with a 30 micrometer thick ethylene vinylacetate copolymer film.

Inner material: A layer formed by laminating a polyethylene film with uniformly distributed holes 1 mm in size and a porosity of 20% to one side of a sheet of pure white paper (40 $g/m^2$) which had been given an oil-repellent treatment, and applying 5 $g/m^2$ of an ethylene vinylacetate copolymer heat seal-adhesive to the other side of the sheet of pure white paper.

Four-side sealed oxygen absorbent packets measuring 50 mm × 50 mm were prepared using a four-side automatic filling and packaging machine. Tests were then conducted on these in the same manner as in Example 1 and the results shown in Table 4 were obtained.

TABLE 4

| Number of holes per packet (in the outer material) | Time required for oxygen concentration to be reduced to 0.1% (hours) |
|---|---|
| 50 | 17 |
| 25 | 23 |
| 10 | 30 |

EXAMPLE 5

Outer material: Hot-melt adhesive (10 $g/m^2$) was applied to a 12 micrometer thick polyethylene terephthalate film to the back of which had been applied while, full-surface printing.

Inner material: Hot-melt adhesive (20 g/m²) was applied to one side of a layer of 50% rayon mixed with Japanese paper (50 g/m²).

Oxygen absorbent packets were obtained in the same manner as in Example 4. These were tested as in Example 1 and the results shown in Table 5 were obtained.

TABLE 5

| Number of holes per packet (in the outer material) | Time required for oxygen concentration to be reduced to 0.1% (hours) |
|---|---|
| 50 | 16 |
| 25 | 23 |
| 10 | 29 |

EXAMPLE 6

Outer material: A laminated film consisting of a 12 micrometer thick polyethylene terephthalate film to the back (inner side) of which had been applied letter printing and white full-surface printing, and which had then been laminated to a 30 micrometer thick polyethylene film.

Inner material: A polyethylene film with uniformly distributed pores 1 mm in size and a porosity of 20% was laminated onto one side of a nylon nonwoven fabric (30 g/m²).

Oxygen absorbent packets measuring 50 mm × 50 mm were prepared in the same manner as in Example 1 using a three-side sealing automatic filling and packaging machine. Tests were conducted on each of these in the same manner as in Example 1. The results shown in Table 6 were obtained.

TABLE 6

| Number of holes per packet (in the outer material) | Time required for oxygen concentration to be reduced to 0.1% (hours) |
|---|---|
| 50 | 19 |
| 25 | 25 |
| 10 | 36 |

EXAMPLE 7

Outer material: Glassine paper (40 g/m²).

Inner material: Two polyethylene films with a porosity of 20% laminated to opposite sides of a sheet of kraft paper (50 g/m²) which had been given a water-repellent and oil-repellent treatment.

Oxygen absorbent packets were prepared in the same manner as in Example 1. These were tested and the results shown in Table 7 were obtained.

TABLE 7

| Number of holes per packet (in the outer material) | Time required for oxygen concentration to be reduced to 0.1% (hours) |
|---|---|
| 50 | 18 |
| 25 | 26 |
| 10 | 34 |

We claim:

1. An oxygen absorbent packet comprising an oxygen absorbent packaged and sealed in a double packaging material, said double packaging comprising four layers on each side of said oxygen absorbent, a gas-permeable outer material layer, a first gas-permeable sealing layer, a gas-permeable inner material layer, and a second gas-permeable sealing layer, said packet containing an air layer between said gas-permeable outer material layer and said first gas-permeable sealing layer.

2. The oxygen absorbent packet of claim 1 wherein said gas-permeable outer material layer is selected from the group consisting of plastic film and transparent paper and said gas-permeable inner material layer is selected from the group consisting of paper and nonwoven cloth.

3. The oxygen absorbent packet of claim 2 wherein said outer material layer is selected from the group consisting of polyethylene terephthalate film and polyamide film.

4. The oxygen absorbent packet of claim 2 wherein said inner material layer is selected from the group consisting of Japanese paper, rayon mixed paper, and polyamide nonwoven cloth.

5. The oxygen absorbent packet of claim 2 wherein said first sealing layer is hot melt adhesives selected from the group consisting of holt melt emulsions, ionomer latexes, ionomer emulsions, polyethylene emulsions, or ethylene-vinylacetate copolymer emulsions.

6. The oxygen absorbent packet of claim 2 wherein said gas-permeable inner material layer comprises water- and oil-resistant paper and said first gas-permeable sealing layer comprises ethylene vinylacetate copolymer.

7. The oxygen absorbent packet of claim 2 wherein said second gas-permeable sealing layer is selected from the group consisting of ethylene vinyl-acetate copolymer, linear low-density polyethylene and ionomer.

8. The oxygen absorbent packet of claim 2 wherein said oxygen absorbent is an iron-based oxygen absorbent.

9. The oxygen absorbent packet of claim 2 wherein said packet is sealed on three sides.

10. The oxygen absorbent packet of claim 2 wherein printing has been applied to the back surface of said gas-permeable outer material layer.

11. The oxygen absorbent packet of claim 2 wherein said gas-permeable outer material layer comprises polyethylene terephthalate film, said first gas-permeable sealing layer comprises hot melt adhesives, said gas-permeable inner material layer comprises Japanese paper and said second gas-permeable sealing layer comprises linear low-density polyethylene, and wherein said gas-permeable inner material layer is laminated on one side to said gas-permeable first sealing layer and said gas-permeable inner material layer is laminated on the other side to said second gas-permeable sealing layer.

12. The oxygen absorbent packet of claim 2 wherein said second gas-permeable sealing layer comprises a polyethylene film provided with cracks.

13. An oxygen absorbent packet comprising an oxygen absorbent packaged and sealed in a double packaging material, said double packaging material comprising four layers on each side of said oxygen absorbent, a gas-permeable outer material layer, a first gas-permeable sealing layer, a gas-permeable inner material layer, and a second gas-permeable sealing layer, said packet containing an air layer between said first gas-permeable sealing member and said gas-permeable inner material layer.

14. The oxygen absorbent packet of claim 13 wherein said gas-permeable outer material layer is selected from the group consisting of plastic film and transparent paper and said gas-permeable inner material layer is selected from the group consisting of paper and nonwoven cloth.

15. The oxygen absorbent packet of claim 14 wherein said outer material layer is selected from the group consisting of polyethylene terephthalate film and polyamide film.

16. The oxygen absorbent packet of claim 14 wherein said inner material layer is selected from the group consisting of Japanese paper, rayon mixed paper, and polyamide nonwoven cloth.

17. The oxygen absorbent packet of claim 14 wherein said first sealing layer is selected from the group consisting of polyethylene and ethylene vinylacetate copolymer.

18. The oxygen absorbent packet of claim 14 wherein said gas-permeable inner material layer comprises water- and oil-resistant paper and said first gas-permeable sealing layer comprises ethylene vinylacetate copolymer.

19. The oxygen absorbent packet of claim 14 wherein said second gas-permeable sealing layer is selected from the group consisting of ethylene vinyl-acetate copolymer, linear low-density polyethylene, and ionomer.

20. The oxygen absorbent packet of claim 14 wherein said oxygen absorbent is an iron-based oxygen absorbent.

21. The oxygen absorbent packet of claim 14 wherein said packet is sealed on three sides.

22. The oxygen absorbent packet of claim 21 wherein said gas-permeable outer material layer is larger than said gas-permeable inner material layer.

23. The oxygen absorbent packet of claim 14 wherein printing has been applied to the back surface of said gas-permeable outer material layer.

24. The oxygen absorbent packet of claim 14 wherein said gas-permeable outer material layer comprises polyethylene terephthalate film, said first gas-permeable sealing layer comprises polyethylene film, said gas-permeable inner material layer comprises Japanese paper and said second gas-permeable sealing layer comprises linear low-density polyethylene, and wherein said gas-permeable outer material layer is laminated to said gas-permeable first sealing layer and said gas-permeable inner material layer is laminated to said second gas-permeable sealing layer.

25. The oxygen absorbent packet of claim 14 wherein said second gas-permeable sealing layer comprises a polyethylene film provided with cracks.

* * * * *